Sept. 7, 1965
E. W. SPANNHAKE
3,204,534
DRAWBAR MULTIPLIER
Filed Jan. 24, 1963
4 Sheets-Sheet 2
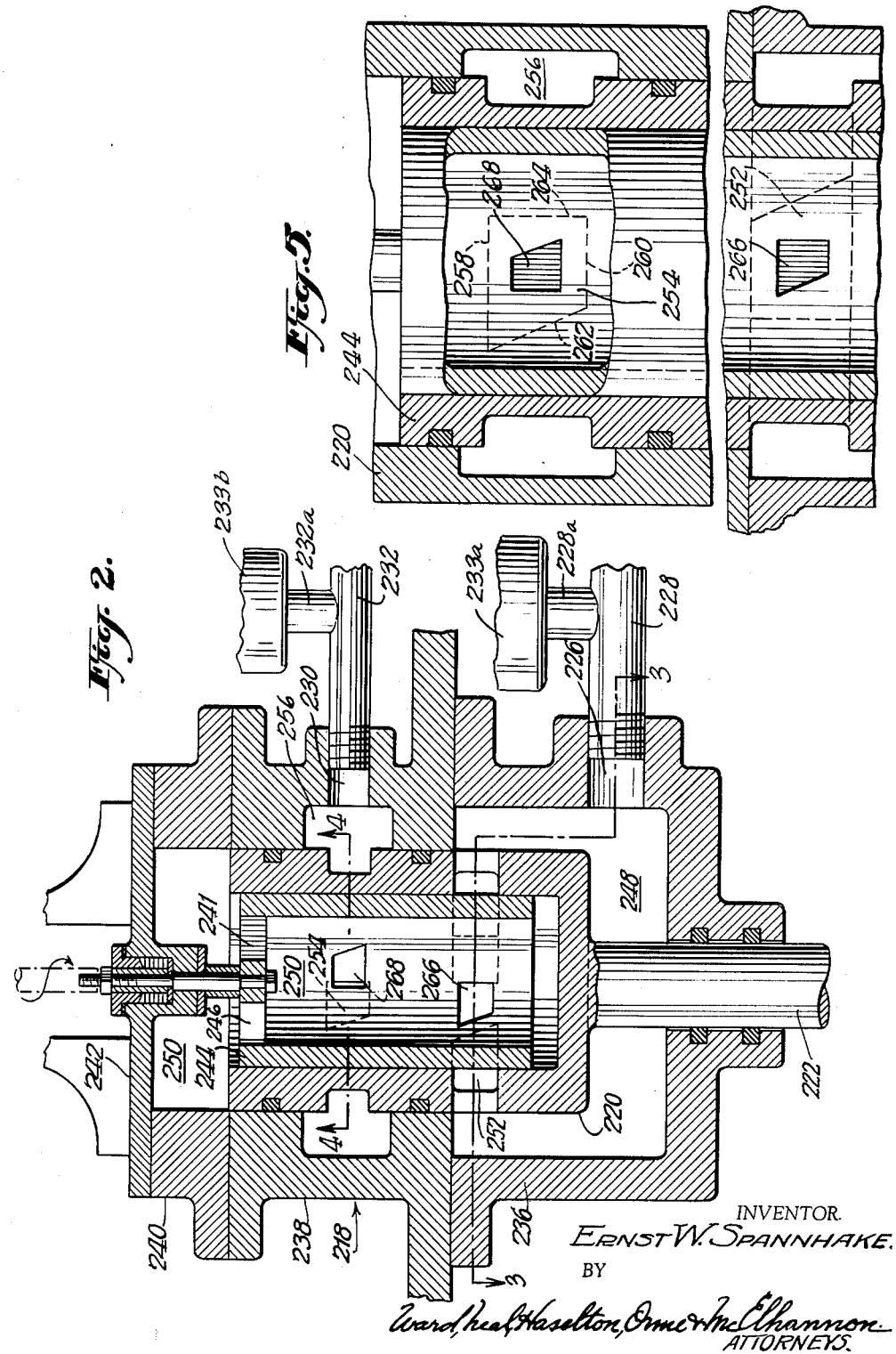
INVENTOR.
ERNST W. SPANNHAKE.
BY
Ward, Neal, Haselton, Orme & McElhannon
ATTORNEYS.

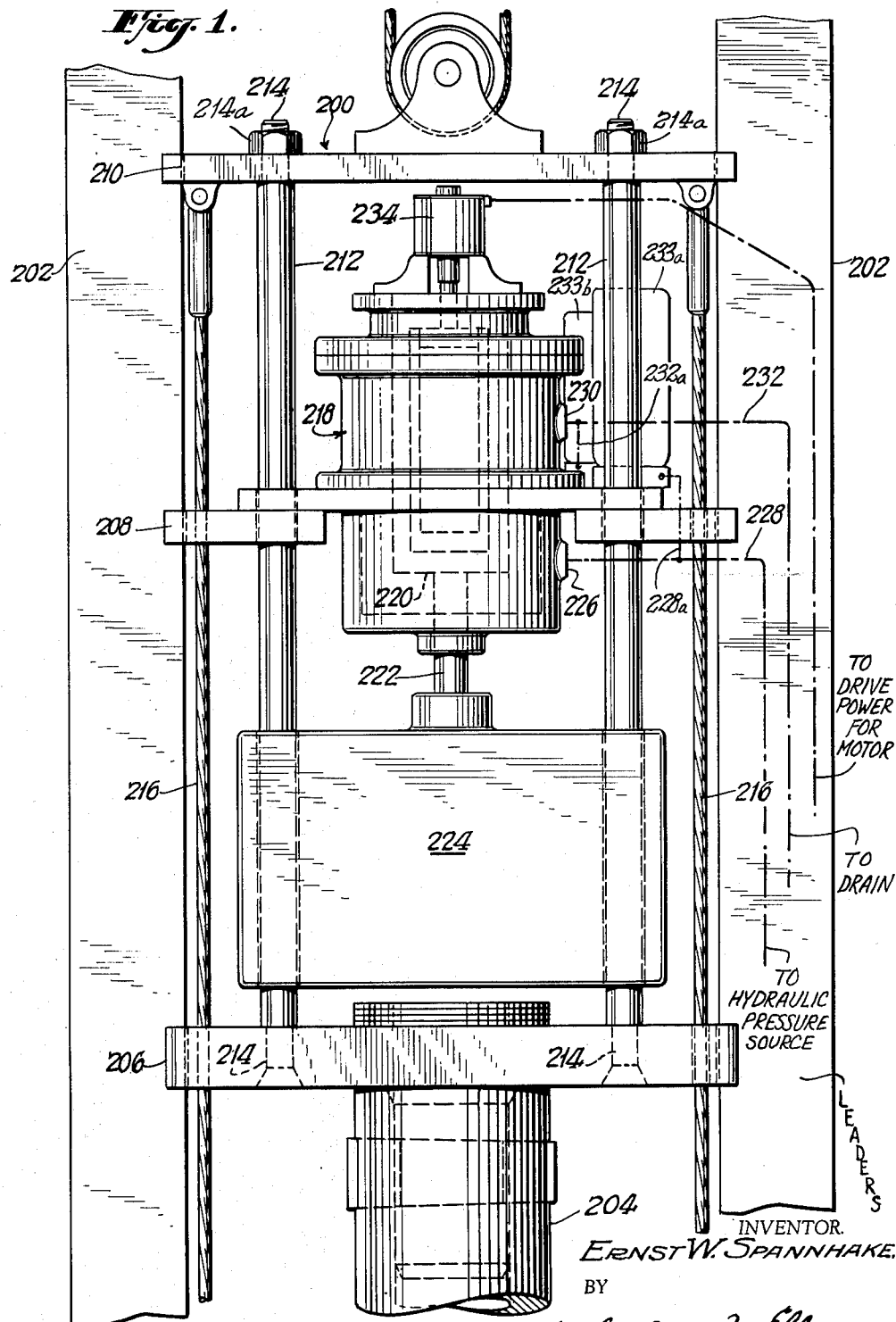

Sept. 7, 1965 E. W. SPANNHAKE 3,204,534
DRAWBAR MULTIPLIER
Filed Jan. 24, 1963 4 Sheets-Sheet 3
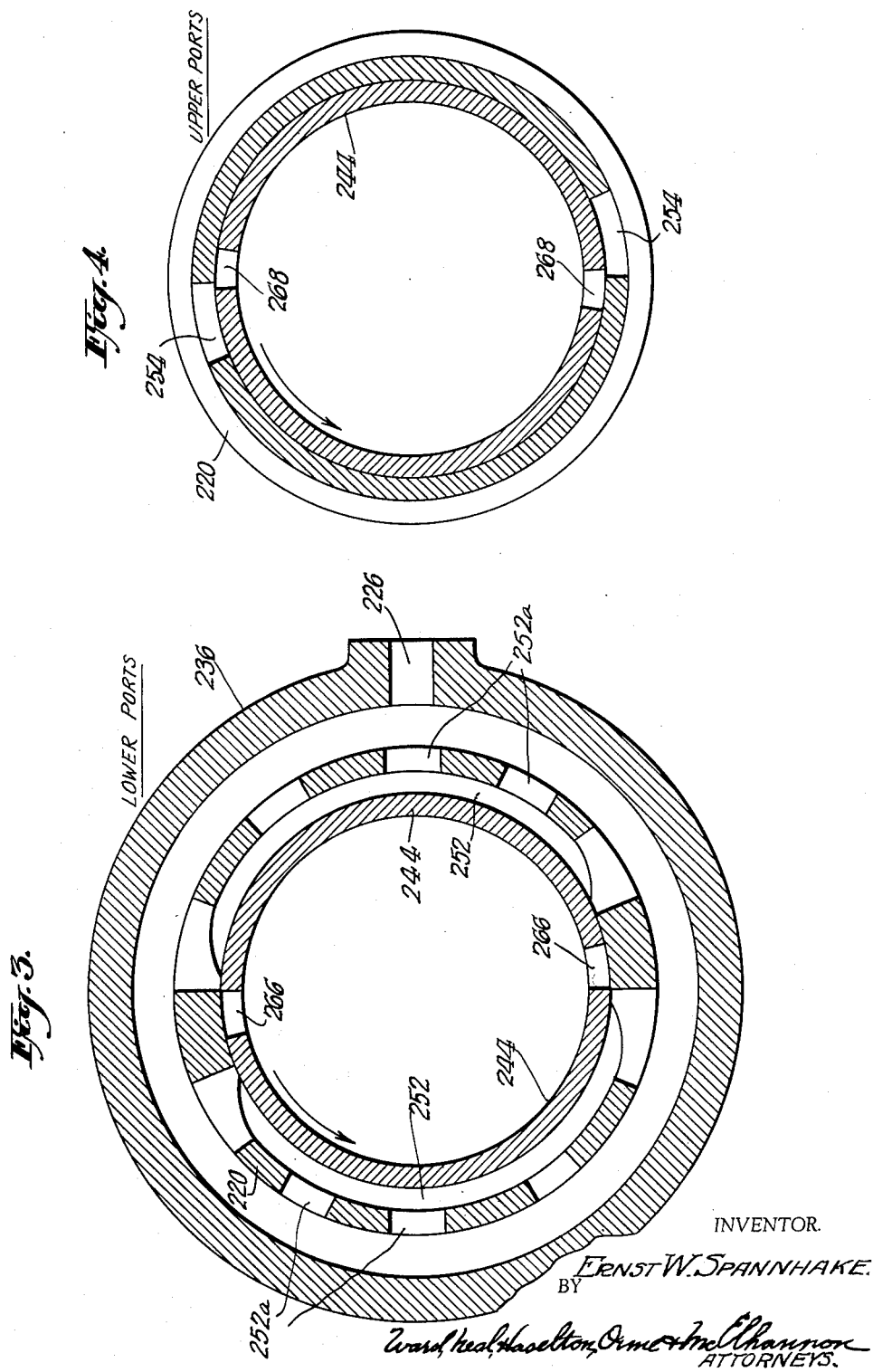
INVENTOR.
ERNST W. SPANNHAKE.
BY
Ward, Neal, Haselton, Orme & McElhannon
ATTORNEYS.

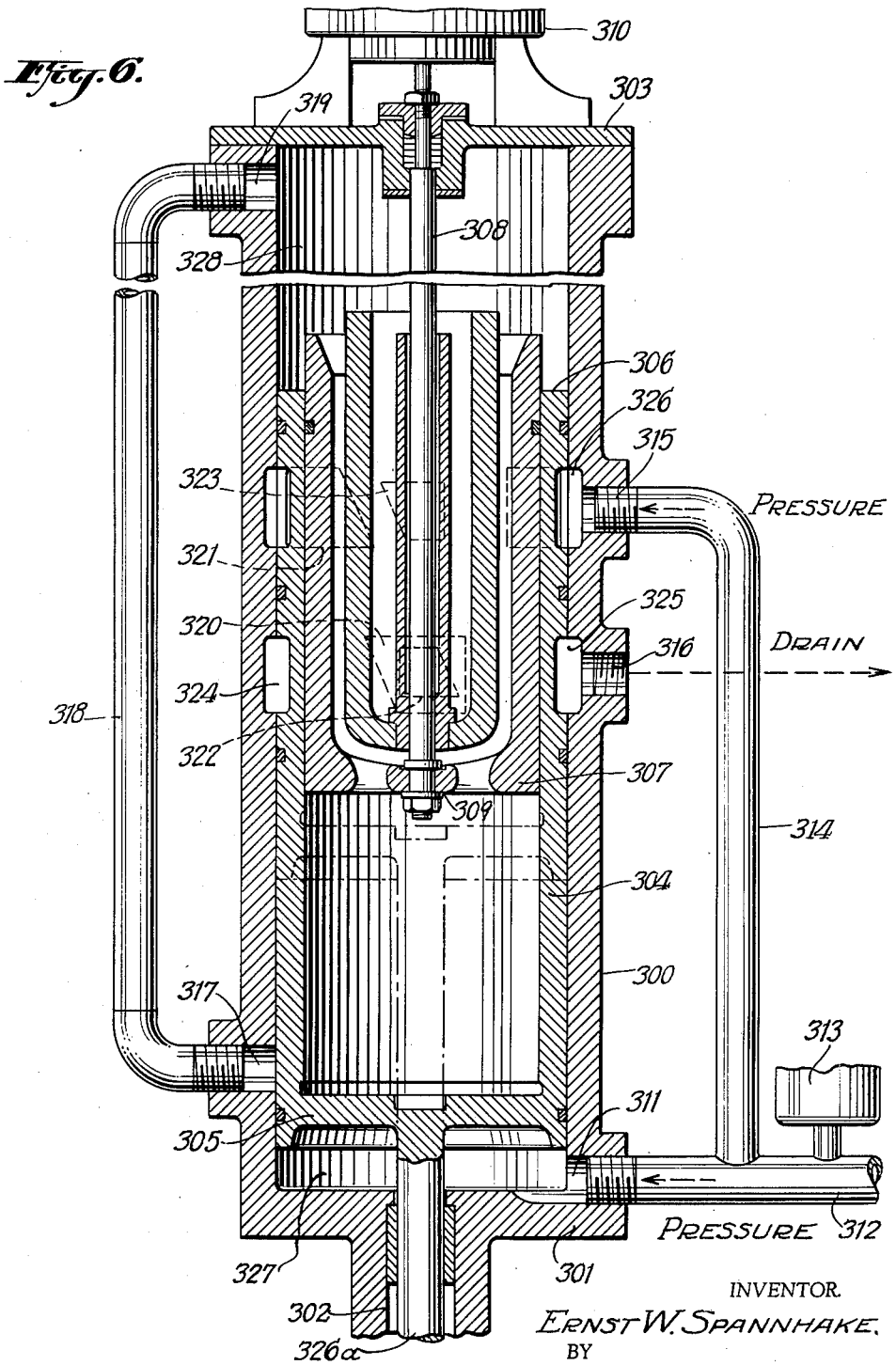

3,204,534
DRAWBAR MULTIPLIER
Ernst W. Spannhake, Smoke Rise, Butler, N.J., assignor to Raymond International Inc., New York, N.Y., a corporation of New Jersey
Filed Jan. 24, 1963, Ser. No. 253,595
21 Claims. (Cl. 91—40)

This invention relates to inertial force producing means and more particularly it concerns apparatus for providing or augmenting the driving capacity of certain types of industrial equipment.

One aspect of the invention concerns utilization of forces derived from the momentum inherent in a moving object. According to this aspect, a freely swinging or otherwise constrained inertial mass mounted on a supporting equipment, is caused abruptly to change its velocity relative to the equipment, thus transferring its kinetic energy or energy of motion to the equipment. This provides or augments the force producing capacity of the equipment by an amount proportional to the rate of velocity change undergone by the inertial mass. In the preferred embodiment of the invention a hydraulic piston and cylinder arrangement mounted on the equipment and operated by a source of hydraulic pressure is provided to move the mass relative to the equipment, as by securing the mass to a piston rod of the piston, and the necessary sudden velocity changes are produced simply by reversing fluid flow in the cylinder. This tends to inhibit further motion of the piston which under the influence of the moving inertial mass sweeps through the cylinder and drives the fluid therefrom against the operating hydraulic pressure.

As the inertial mass is driven in one direction by hydraulic displacement of the piston in the cylinder, the force exerted by the piston on this mass, produces an equal and opposite force of reaction between the piston and the equipment on which the cylinder is mounted, and it is this reaction force which is utilized in accordance with the principle of the present invention to effect a work performing function. Thus the equipment in question may comprise simply a framework secured to the top of a pile or pile casing to be driven into the ground, or it may be the movable member of a forging press, or the earth displacing blade of a bulldozer, etc., etc. If, therefore, the force exerted by the piston on the inertial mass is greater in one direction of reciprocation than the other, as can be obtained by the use of a differential piston as explained below, the resulting reaction against the equipment in the first direction of reciprocation can be utilized to provide or augment the desired work producing operation, without appreciable loss of effectiveness or other undesirable action during the piston return stroke.

It will be seen that by virtue of this principle of operation, the present invention does not employ the inertial mass as an impact tool, nor does it abstract the kinetic energy from the moving mass in this way, i.e., by causing it to strike an object and thus be brought abruptly to rest. Nor does it operate on the principle of abruptly stopping the inertial mass by means of a "hydraulic lock," as by suddenly closing the valve ports, when the piston movement has accelerated the mass to a selected velocity. For generating forces of the magnitude which the present invention contemplates, such technique would result in breakage of the equipment and bursting of hydraulic lines involved in such a hydraulic lock. Inertial force producing systems based on either of the above expedients, i.e., impact or hydraulic lock, involve as requisite steps of: first, the imparting of forward gathering momentum to the mass; secondly, energy transfer by impact or hpdraulic lock; and thirdly, repositioning of the mass for repeating this cycle of operations.

By contrast and in accordance with the principle of the present invention, the abstraction of kinetic energy from the moving mass and the repositioning of the mass are combined in one operation by a simple force reversal in the hydraulic cylinder, utilizing only substantially the normal operating hydraulic pressure of the system, and in fact assuring that the pressure in this cylinder and connecting conduits never exceeds the normal operating pressure by more than about 10–20%. Thus the system operation of the invention employs only two significant steps: i.e., first, force on the inertial mass in the forward direction, with corresponding reaction force on the equipment in the rearward direction; and secondly, force on the inertial mass in the rearward direction with corresponding force on the equipment in the forward direction. The first step diminishes the driving force, the second step augments it. The time integral of the force, or the average force exerted during the aforesaid cycle is not changed by the apparatus of the invention. The application of the force, however, is modified into a duration of high force followed by a duration wherein the total exerted force is almost zero or even negative. This mode of operation proves extremely practical in cases where the total resistance of the material to be worked (amount of dirt, a tree, a pile) exceeds the steady force which the equipment is capable of exerting.

A basic objective of the invention is to multiply the capability of overcoming resistance or of augmenting preferably by at least three times, the force that the equipment is normally capable of sustaining without this invention. This implies from the above that during the first mentioned state of applying force to the equipment in the reverse direction hydraulically, this force, except in very rare cases, should not exceed the steady bias force on the equipment, as otherwise the equipment will be jerked back from the work piece with corresponding loss of efficiency. It is a definite advantage to provide means whereby the forward acting multiplying force—although completely controlled and not of a blow-like nature (hence of considerable duration in time)—is made considerably greater (between 3 and 4 times as great) than the force retarding the equipment. Mechanical devices which have heretofore been designed to achieve similar effects have always been hampered by: (a) the dependence of force upon frequency; (b) the inability to exceed the ratio of 2:1 between forward and rearward component of the force with any practical apparatus.

A main feature of the present invention thus resides in the production of the abrupt change of velocity at a point in the movement of the inertial mass where most effective and efficient utilization of its kinetic energy can be obtained. It has been found for example that from considerations of machinery limitations and equipment movements as well as for overall effectiveness, the optimum instant of abrupt change of velocity depends upon both the location of the inertial mass (and consequently the position of the piston within the hydraulic cylinder) as well as on its velocity. According to the present invention, means are provided which take both these factors into account so that optimum operating conditions are automatically maintained irrespective of changes which may be introduced either intentionally or accidentally into the inertial system parameters.

In one embodiment of the invention, the hydraulic piston itself is hollow or cup-like, and has specially shaped and specially located valve openings which extend between its inner and outer wall surfaces. A tubular slide valve element, also having specially shaped and specially located valve openings, is provided with its exterior surface in closely fitting, slideable relationship with the interior surface of the hollow piston. The slide valve element is made to rotate at constant speed while the hydraulic piston reciprocates. Whenever the valve openings in the piston and slide valve element are aligned, hydraulic fluid flows therethrough to drive the piston in a direction corresponding to the particular openings in alignment. Because of the special shape of the valve openings, which in the preferred arrangement are in a tapered configuration lengthwise of the piston, the position of the piston at the time they become aligned determines the amount of rotation of the valve element necessary to bring them out of alignment. However, the longitudinal velocity of the piston during this time augments the closure or out-of-alignment rate proportionately so that the instant of stopping piston movement again is dependent upon both piston position and velocity. The basic feature is that the resulting forces on the equipment are characterized by a force in the desired direction of comparably short duration and high intensity followed by a force in the opposite direction of low intensity and comparatively long duration, while at the same time the mean position of the inertial mass relative to the equipment is automatically maintained regardless of disturbances.

For achieving these results a piston operating on the differential principle is preferably employed, in which a piston rod of substantial cross-sectional area extends from one end of the piston and thence through an axial bore of the cylinder and thence to the inertial mass secured thereto. Hydraulic fluid under pressure is continuously applied to the rod end of the piston, while said hydraulic pressure and drain are alternately applied to the opposite end throughout appropriate stages of piston reciprocation. Thus the force acting on the piston in one direction of displacement is the product of the hydraulic pressure and the difference between the piston and piston rod transverse areas; whereas the force acting on the piston in the opposite direction of displacement, is the product of the hydraulic pressure and the piston rod transverse area, since the opposed pressures on the remaining transverse piston area balance out. Accordingly by proportioning the cross-sectional area the piston minus that of the piston rod to be, for example, three to four times the latter area, the force exerted by the inertial mass in one direction of reciprocation as compared to the other will be in the same proportion, i.e., 3–4:1 in the example given. Since, however, the ultimate momentum of the reciprocating system must be the same in each direction of reciprocation, the duration of the piston stroke in one direction as compared to the other will be in the inverse ratio of the aforesaid forces.

It is an object of this invention, therefore, to provide an improved inertial force developing or augmenting means for use with driving, pushing, or vibration equipment, as well as for forging, pressing or otherwise shaping materials in a plastic state, among other applications.

It is another object of the present invention to impart versatility to such equipment through the provision of vibratory inertial force producing means having self-adaptive capabilities.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Preferred embodiments of the invention have been chosen for purposes of illustration and description, and are shown in the accompanying drawings, forming a part of the specification, wherein:

FIG. 1 is an illustration of the operative portion of a pile driving apparatus which utilizes the principles of the present invention;

FIG. 2 is an axial, sectional view of the piston, cylinder and valve arrangement used in the apparatus of FIG. 1;

FIGS. 3 and 4 are, respectively, transverse sectional views of FIG. 2, as taken at 3—3 and 4—4 thereof;

FIG. 5 is an enlarged, fragmentary view of FIG. 2 in the regions of 3—3 and 4—4 thereof, illustrating the valve port relationship shown thereat, respectively, with the lower portion of the drawing rotated 90° with respect to the upper portion;

FIG. 6 shows in axial sectional elevation a modified form of an apparatus according to the invention.

The pile driver apparatus shown in FIG. 1 comprises, a force producing mechanism 200 transversely supported between a pair of guide columns 202 which are mounted in parallel alignment on either side of a pile element 204. The force producing mechanism includes lower, intermediate and upper platforms 206, 208 and 210 longitudinally displaced from each other and extending between the guide columns. The respective platforms are notched in the vicinity of the guide columns so that they may be guided in their longitudinal movements.

A pair of tubular spacer rods 212 extend longitudinally between the upper surface of the lower platform 206 and the lower surface of the upper platform 210. Tension bolts 214 secured by nuts 214a, are provided within the tubular spacer rods for securing the upper and lower platforms in fixed spaced relationship. The intermediate platform 208 is attached to the spacer rods approximately at their midpoint. The weight of this structure produces a continuous force bias on the top of the pile element 204.

A pair of cables 216 or other linkage may be attached to the upper platform so that weights or other sources of constant pull (not shown) may be connected to the force producing mechanism to provide additional continuous force bias.

A hydraulic cylinder 218 having a closely fitting piston 220, see FIG. 2, and piston rod 222, is mounted on the intermediate platform 208, with the piston rod 222 extending downwardly toward the pile element 204. An inertial mass 224 is affixed to the lower end of the piston rod 222 between the intermediate and lower platforms. The inertial mass is provided with grooves or holes in the vicinity of the tubular spacer rods 212 so that it may be guided for longitudinal movement between the rods.

The hydraulic cylinder 218 has an input port 226 which is supplied with high pressure hydraulic fluid via a feed line 228 from a pump (not shown). The cylinder also has an output port 230 through which expelled hydraulic fluid passes. A drain line 232 is connected to the output port and conveys the expelled fluid to a reservoir (also not shown). A pair of accumulators 233a and 233b are mounted on the platform 208, and are tapped, respectively, to the feed and drain lines 228, 232, as at 228a, 232a, for purposes explained below.

A motor 234 is mounted on the top of the hydraulic cylinder and operates to drive a rotary valving system, to be described. The motor may be any constant or adjustable speed rotary driving source such as an electrical motor or a hydraulic motor or turbine.

During operation of the pile driver, hydraulic fluid is continuously forced through the cylinder and the valving system, while the motor at the top of the cylinder keeps the valving system in continuous operation. As will be described, the valving system is such that the fluid is directed in a manner causing the inertial mass to undergo reciprocal motion in the longitudinal direction. The fluid first forces the inertial mass in an upward direction so that its upward velocity rapidly increases, which applies a very large driving force to the top of the pile element. When the velocity of the mass and its position reach proper values the valving arrangement operates to produce a hydraulic reversal of force between the piston and the cylinder. This causes a gradual deceleration of the mass relative to the remainder of the force producing mechanism. The hydraulic force reversal also ultimately reverses the motion of the inertial mass until it moves in the direction toward its lower position, again at the proper value of its velocity and position, force reversal occurs due to valving operation which will first decelerate it and then start the cycle over by forcing it in an upward direction. During the hydraulic force reversals the accumulators 233a, 233b, absorb sufficient of the surge pressures to prevent injury to the equipment.

The manner in which the piston, cylinder and valving arrangement coact to produce the desired movements of the inertial element may be understood more readily by reference to the enlarged sectional views of these elements shown in FIGS. 2–5, incl. Here the hydraulic cylinder is seen to be made up of a lower, a central and an upper cylinder housing, designated, respectively, as 236, 238, 240, and a cover plate 242. The piston 220 is hollow and cup-shaped as shown, and has a cylindrically shaped inner chamber. The piston rod 222 is centrally applied to the lower end of the piston 220, and extends outwardly through a bore in the end of the lower cylinder housing 236. A tubularly shaped rotary sleeve valve 244 is provided in close fitting arrangement with the inner surface of the hollow portion of the piston. The rotary sleeve valve is adapted to be rotated at a constant speed by means of the motor 234 of FIG. 1 which is mounted above the cover plate 242. Slots 246 or other openings are provided in the upper end of the rotary sleeve valve to permit hydraulic communication between its interior and the interior portion of the upper cylinder housing 240.

The piston 220 in the arrangement shown, effectively divides the cylinder into first and second hydraulic chambers, designated, respectively, as 248 and 250. The first chamber 248 is seen to occupy the annularly shaped space about the piston and piston rod within the lower cylinder housing 236. The second chamber 250, on the other hand, occupies the space within the piston and rotary sleeve valve as well as the space enclosed by the upper cylinder housing 240 and the cover plate 242. The first chamber 248 is permanently connected to the high pressure feed line 228 through the input port 226. The first and second chambers are alternately brought into and out of communication by means of the rotary valve 244. The second chamber 250 likewise is alternately brought into and out of communication with the low pressure drain line 232 through the output port 230.

The piston 220 is provided with a first set of one or more oppositely disposed high pressure valve ports 252, as shown more particularly in FIG. 3, which extend from its inner surface, and thence through a series of openings, as at 252a, to its outer surface, so that when uncovered they provide communication between the input port 226 and the interior of valve 244 as explained below. The piston also contains a second set of one or more valve ports 254, as shown more particularly in FIG. 4, angularly displaced from the first ports and longitudinally separated therefrom. These second ports extend between the inner surface of the piston and an annular passage 256 in the second cylinder housing 238, so that when uncovered they provide fluid communication between the second chamber 250 and the output port 230.

The valve ports in the piston are preferably of generally trapezoidal shape having essentially parallel upper and lower sides as at 258 and 260, FIG. 5, and hence lying transversely of the piston and separated by an amount greater than the maximum piston stroke. The valve ports also have non-parallel sides as at 262 and 264, FIG. 5, which extend longitudinally of the piston for purposes to be explained below.

The rotary sleeve valve 244 is likewise provided with sets of one or more valve ports, as at 266 and 268, FIG. 4, corresponding to and in the same relative longitudinal locations as the valve ports 252 and 254, respectively, in the cylindrically shaped piston. The valve ports in the rotary sleeve valve are similar in geometrical configuration to their corresponding ports in the piston but are preferably smaller in size and their trapezoidal configurations are inverted with respect thereto as at 268, 266, FIG. 5.

The relative rotational relationship of each of the pairs of valve ports, in both the piston and in the rotary sleeve, is best seen in FIGS. 3 and 4, which show a preferred arrangement of two ports per set which are oppositely disposed. One reason for this is that it creates hydraulic balance with no radial forces being present due to the flow through the ports. Another is that the frequency of oscillation becomes twice the frequency of motor 234. One port would serve the same purpose but then the motor 234 would have to run at a speed equal to the frequency of oscillation. On the other hand, the ports would extend over twice the angular distance in both piston and sleeve valve and thus could be made either of lesser height or containing more area. By the same token, three sets of ports could be used with the motor running at one-third the oscillating frequency and the angular dimensions being two-thirds of the ports as shown.

It will be noted from FIGS. 3 and 4, that while in the piston 220 the midpoints of the upper and lower valve ports 254 and 252 are rotationally displaced by essentially 90°, the midpoints of the upper and lower ports 268 and 266 of the rotary sleeve valve 244 are essentially in alignment. Because of this, it will be seen that, for one set of positions of the sleeve valve, fluid communication is achieved between the first and second chambers 248 and 250 of the hydraulic cylinder while isolation is maintained between the second chamber 250 and the outlet port 230; and that for a second set of positions, essentially 90° displaced from the first set of positions, isolation is provided between the first and second cylinder chambers, while fluid communication is provided between the second chamber 250 and the output port 230. Between these two sets of valve positions isolation is maintained between piston ports 254 and 252, except for a small overlap during the transition from one state to the other to prevent hydraulic lock and allow for a smooth transition of one force system to another. This overlap by way of illustration is shown at the moment when the lower valve ports 266, FIG. 3, are just closing and upper valve ports 268, FIG. 4, are already partially open.

Thus as the valve sleeve 244 rotates, the following sequence takes place (bearing in mind that high pressure hydraulic fluid is continuously applied to the lower cylinder chamber 248 via the high pressure intake line 228 connected thereto); first, with the piston 220 approaching the top of its stroke, the upper chamber 250 is exposed to this high pressure hydraulic fluid through the lower valve ports 252, 266; second, the upper chamber 250 is exposed to both high pressure and drain through narrow slits of the lower and upper valve ports which are about to close and open, respectively; third, the upper chamber 250 is exposed to drain through the upper valve ports 254, 268; and fourth, the upper chamber 250 is exposed both to drain and high pressure through narrow slits of the lower and upper valve ports which are now about to open and close, respectively. Because the transverse piston area in the upper chamber 250 is greater than that in the lower chamber 248, a greater force is produced by the fluid on the upper side of the piston than on the lower side, during the first step in the sequence, and the piston is forced downwardly after the rapid switching of force direction during step two, the downward movement of the piston is decelerated rapidly relative to the cylinder during the third step, by virtue of the fact that the upper chamber 250 is now connected to drain pressure, while high pressure is still being continuously applied to the lower chamber 248 via the high pressure supply line 228. This will eventually reverse the piston movement, causing it to be forced upwardly, the upward motion being terminated after switching in the fourth step during the recurring first step.

Referring now to FIG. 5, an enlarged view of a typical set of each of the upper and lower valve openings through the piston and rotary sleeve valve element can be seen, the lower piston portion of the drawing below the break being shown as rotated through essentially ninety degrees with respect to the upper portion. It will be noted that, because of the fact that the rotary valve does not reciprocate but only rotates while the piston reciprocates but does not rotate, the longitudinal dimensions of the valve ports 252, 254, in the piston must necessarily be great enough to permit communication with the associated rotary valve sleeve ports 266, 268, respectively, or vice versa, over the entire piston stroke. Also as shown in FIG. 5, the trapezoidal configuration of the valve ports is such that their oppositely disposed tapered sides are always substantially parallel, irrespective of the longitudinal position of the piston. This tapered arrangement provides automatic adjustment of the length of time during which the first and third steps of the previously described sequence take place, which in turn provides automatic adjustment of piston stroke.

Thus it will be noted, still referring to FIG. 5, that as the average position of piston 220 moves upwardly relative to the sleeve valve 244, the angular sector throughout which the upper or drain valve ports 254, 268, remain in alignment, decreases; whereas the angular sector throughout which the lower or pressure valve ports 252, 266, remain in alignment, increases. Thus the interval of each rotation during which the upper cylinder chamber 250 is connected to drain is decreased, while correspondingly the interval during which the upper chamber is connected to high pressure fluid, is increased. The duration and length of the upstroke is thus decreased and that of the downstroke increased, to provide a corrective action whereby the mean position of the piston is shifted downwardly with respect to the valve until a preselected position of normal operation is reattained. The reverse action of course occurs if the average position of the piston moves downwardly with respect to the valve below the normal position of operation. In this manner the mean piston position is maintained centrally within the hydraulic cylinder without mechanical support. Frequency and length of stroke correction result when the same valve and piston assembly are used with an inertial mass of different magnitude.

Although the trapezoidal configuration of these ports is preferred, other shapes may be employed, such as triangular, elliptical, diamond, etc., the criterion being that the angular sector of alignment between the piston and valve ports, increases in one direction of piston shifting with respect to the sleeve valve, and conversely decreases in the opposite direction of such shift.

It is to be noted that when the apparatus of the above invention does not do any work, in other words when it does not move in the direction of the driver force, the theoretical oil consumption becomes substantially zero. This results from the fact that in this case the forward force reversal occurs at the same position of the inertial mass as the rearward force reversal. That is to say, the inertial mass, having achieved a certain velocity, is simply being decelerated by the hydraulic force, and then accelerated again to the same velocity in the reverse direction. During this time, the hydraulic cylinder ejects the same amount of oil that it takes in during the reversal of the velocity. Under the reverse force portion of the cycle, the same action occurs.

Referring to FIG. 2, in the absence of the accumulator 233a, the high pressure oil being displaced from the cylinder as the piston descends, would simply spill through the pressure control valve of the supply pump and be wasted; whereas with the accumulator installed as shown, this oil passes into the accumulator to be resupplied to the hydraulic cylinder at a subsequent stage of the cycle. Thus the accumulator 233a must have sufficient capacity to absorb the high pressure oil displaced from the hydraulic cylinder during the decelerating portion of its velocity cycle, without producing an undue rise in pressure in the supply line 228.

The drain line accummulator 233b, merely smooths out pressure surges in the drain line 232, and thus eliminates surges from the drain discharge delivered through the drain line 232.

As was pointed out in the FIGS. 1–5, incl., embodiment of the invention as above described, the piston ports 252, 254 or the valve ports 266, 268, are made of a length longitudinally of the piston exceeding that of the maximum stroke of the piston, in order to assure registry, irrespective of the piston displacement during the registry intervals. This can be done without appreciable lengthening of the piston and cylinder, in applications of the invention wherein only a relatively short stroke piston displacement is required for effecting the requisite force producing action, as, for example, where the required piston stroke does not exceed several inches.

Where, however, the required piston stroke is on the order of a foot or more, an undue lengthening the piston and cylinder is required to meet this condition. For example, assuming the piston stroke at precisely one foot, the length of each of the piston intake and drain ports would be something in excess of one foot; and since further the intake ports must be longitudinally displaced with respect to the drain ports in order to prevent improper registry with the sleeve valve intake and drain ports, the required piston length would be in excess of two feet and the cylinder length in excess of three feet, the latter in order to accommodate the piston length plus the assumed one foot piston displacement.

An additional objection to the provision of piston ports exceeding in length the piston stroke under the above assumed long-stroke conditions, is that the piston ports would thus be necessarily relatively long and narrow in order proportionately to conform to the transverse dimensional limitations of the piston. This would result in a severe throttling action between the piston and associated sleeve valve ports, since during most of the rotational registry intervals between them, the variation in longitudinal overlap between the passages through the valves would leave them only partially open, unless the valve passages were made excessively long.

There are, however, a number of applications wherein a long-stroke hydraulic force multiplying apparatus in accordance with the invention is desired, but which nevertheless overcomes the above-mentioned objectionable features resulting from the employment of piston or sleeve valve ports exceeding in length the maximum piston displacement. FIG. 6 shows a modified form of such apparatus which meets these conditions, and in which the piston stroke considerably exceeds the height of the piston and sleeve valve ports. An apparatus of this modified type is especially applicable if the "large force" portion of the cycle need only be of relatively short duration in relation to the "small force" portion thereof.

Referring to FIG. 6, the construction and arrangement of parts in which is generally similar to those of the embodiment previously described, there is shown a hydraulic cylinder 300, closed at its base, as at 301, except for an axial bore, as at 302, to provide a piston rod passage. The cylinder at its opposite end is closed by a cover plate 303. Slidably fitted within the cylinder is a piston 304, of hollow, cup-like configuration, closed at its base, as at 305, and open at the top, as at 306. A rotary sleeve valve 307 is slidably fitted within the cylindrical wall of the piston interior, as shown, and is rotatably mounted therein on a driving spindle 308, extending axially therethrough and bolted and keyed to the base of the sleeve valve 307, as at 309, the spindle being driven by a motor 310 mounted on the cylinder cover plate 303.

The cylinder is penetrated at its base by an intake port 311 connected to a pressure line 312 for supplying hydraulic fluid under continuous pressure thereto, this line having connected thereto an accumulator 313 for purposes above stated. A tap-off connection 314 extends from the pressure line 312 to a second intake port penetrating the cylinder 300 near the top thereof, as at 315. The cylinder is also provided with a drainport 316. Also the cylinder is provided near its base with an auxiliary port 317, which is connected to a conduit 318 extending thence to the upper end of the cylinder and which terminates in an upper port 319 thereof.

The piston 304 and rotary sleeve valve 307 are provided with drain ports 320 and 322, and pressure ports 321 and 323, of the same construction and arrangement as above described with reference to FIGS. 1–5, incl., except that the heights of these ports is considerably less than the piston stroke. The piston drain ports 320 open into a steering groove 324, formed by peripherally grooving the outer piston wall. This groove is adapted with the piston disposed in relation to the cylinder as shown, to mate with a drainage groove 325 formed in the inner cylinder wall, and which communicates with the cylinder drainage port 316, as shown. The circumferential arrangement of ports 320 and 322 is similar to that shown in FIG. 4. Similarly the piston pressure ports 321 with the piston positioned as shown open into an annular chamber 326 formed in the cylinder wall which communicates with the cylinder pressure port 315. The circumferential arrangement of ports 321 and 323 is similar to that shown in FIG. 3.

The closed end 305 of the piston has integral therewith a piston rod 326a which extends through the basal bore 302 of the cylinder, and has secured thereto an inertial mass (not shown) in the same manner as illustrated in FIG. 1.

In the FIG. 6 embodiment of the invention, the timing of the piston and rotary valve drain ports 320, 322, is identical with those for the corresponding ports of the FIGS. 1–5, incl., embodiment. However, in FIG. 6, the ratio of the upward force to downward force on the differential piston 304, has been indicated to be considerably greater than that in the FIGS. 1–5, incl., embodiment, by indicating the piston rod 326a of FIG. 6 to be relatively smaller as compared to the diameter of the differential piston 305, than was the case in the FIG. 1–5, incl., embodiment. If now with reference to the FIG. 6 embodiment, the inertial mass attached to the lower end of the piston rod 326a is made sufficiently small, then the upward velocity imparted to the inertial system during the upward force portion of the operating cycle due to the constant fluid pressure applied through cylinder port 311, becomes sufficiently great, so that the relatively small decelerating force available cannot stop and reverse the piston until the piston has traveled through an appreciable distance. In this case the lower portion of the differential piston 305 will, on the upward traverse uncover the auxiliary cylinder port 317, which through the passage 318 will permit communication of the constant pressure chamber 327 at the base of the cylinder, with the top chamber 328 thereof through its upper port 319 generating the relatively small decelerating force mentioned above. It will be noted that while the cylinder port 317 is thus uncovered, the steering groove 324 in the differential piston 304 has been displaced upwardly and out of communication with the drainage groove 325, thus making it impossible for pressure in the upper part of the differential cylinder to escape through the drainage port 316, regardless of the relative position of the piston and rotary valve drainage ports 320 and 322. Control of force reversal is, therefore, taken away from the rotary valve 307 until the differential piston 304 has returned to its lower position, again covering the cylinder port 317 and unblocking the cylinder drainage port by renewed communication of the piston drainage groove 324 with the cylinder drainage groove 325, as well as communication of pressure ports 321 with annular chamber 326 and cylinder pressure port 315. Control of the inertial mass can now be exercised by proper timing of the pressure ports 321 and 323 and the drainage ports 320 and 322. This makes it possible for the frequency of the rotating valve to be several times that of the inertial mass.

It will be observed that on the down stroke of the piston, as soon as it moves into position to block the lower auxiliary cylinder port 317, it cuts off the supply of hydraulic fluid under pressure via conduit 318 and the upper auxiliary cylinder port 319, so that the pressure from this source supplied to the top of the cylinder drops to zero. Prior to this stage of the operation, however, the piston intake ports 321 pass into registry with the cylinder groove 326 communicating with the pressure port 315, so that hydraulic fluid under pressure is now supplied to the top of the piston through the piston intake ports 321 and the associated sleeve valve intake ports 323. These piston and sleeve valve intake ports 321, 323, pass into registry prior to registration of the piston and sleeve valve drain ports 320, 322. Thus the piston is given a further downward push before the drain ports 320, 322, pass into registry, thus to connect the top of the piston to the cylinder drain port 316 via the steering groove 324.

The piston and rotary valve pressure ports 321, 323 and drainage ports 320, 322, may be formed for valve rotation of sleeve valve 307, at from two or three times the force reversing frequency to a multiple frequency limited only by the rotating speed achievable in a rotating type valve.

What is claimed is:

1. Inertial force producing apparatus, comprising: a hydraulic cylinder, a piston reciprocable therein, an inertial mass reciprocated by said piston, valve means including a first valve member displaceable with said piston and having a cylindrical bore therein, a second valve member fitting rotatably within said bore and means rotatably mounting the same in fixed relation to said cylinder, intake and drain ports individual to said members, respectively, and relatively so disposed as to be brought into successive alignment as to said intake ports and thence as to said drain ports upon rotation of said second valve member, and at least one each of said intake and drain ports being of a length in the direction of said piston displacement exceeding the maximum stroke of said piston.

2. Inertial force producing apparatus, comprising: a hydraulic cylinder, a piston reciprocable therein, an inertial mass reciprocated by said piston, valve means including a first valve member displaceable with said piston and having a cylindrical bore therein, a second valve member fitting rotatably within said bore and means rotatably mounting the same in fixed relation to said cylinder, intake and drain ports individual to said members, respectively, and relatively so disposed as to be brought into successive alignment as to said intake ports and thence as to said drain ports upon rotation of said second valve member, at least one each of said intake and drain ports being of a length in the direction of said piston displacement exceeding the maximum stroke of said piston, and said ports being of a configuration such as progressively to increase the angular sector of alignment of said ports as said first and second valve members are relatively displaced in one direction longitudinally of said piston, and conversely progressively to decrease said angular sector of alignment as said valve members are relatively displaced in the opposite direction longitudinally of said piston.

3. Inertial force producing apparatus, comprising: a hydraulic cylinder, a differential piston reciprocable therein, an inertial mass reciprocated by said piston, valve means including a first valve member displaceable with said piston and having a cylindrical bore therein, a second valve member fitting rotatably within said bore and means rotatably mounting the same in fixed relation to said cylinder, intake and drain ports individual to said members respectively, and relatively so disposed as to be brought into successive alignment as to said intake ports and thence as to said drain ports upon rotation of said second valve member, at least one each of said intake and drain ports being of a length in the direction of said piston displacement exceeding the maximum stroke of said piston, means for continuously impressing hydraulic fluid under pressure upon one end of said piston, means including said intake and drain ports of said valve means for alternately exposing the opposite end of said cylinder to the pressure of said hydraulic fluid and to drain upon rotation of said second valve member, thereby to reciprocate said piston by differential pressure actuation.

4. Apparatus according to claim 3 wherein the intake and drain ports of said valve members are of substantially trapezoidal configuration with their tapered sides extending longitudinally of said piston and relatively so inclined and proportioned, as automatically to correct for deviations in the mean displacement of said piston from a preselected norm thereof with respect to said cylinder.

5. Inertial force producing apparatus, comprising: a hydraulic cylinder, a cup-like piston reciprocable therein, a sleeve valve fitting rotatably and coaxially within said piston, means for reciprocating said piston along its axis including fluid pressure intake and drain ports in said cylinder, and spaced, coacting intake and drain ports in said piston and sleeve valve, respectively, and means for rotating said valve about its axis.

6. Inertial force producing apparatus, comprising: a hydraulic cylinder, a cup-like piston reciprocable therein, a sleeve valve fitting rotatably and coaxially within said piston and means for rotating the same about its axis, means for reciprocating said piston along its axis including, fluid pressure intake and drain ports in said cylinder, said intake port being disposed for continuously applying fluid pressure against one end of said piston, said piston and sleeve valves having intake and drain ports arranged for alternately applying said fluid pressure and drain to the opposite end of said piston as said valve rotates.

7. Inertial force producing apparatus, comprising: a hydraulic cylinder, a cup-like, differential piston reciprocable therein and having integral with its closed end a piston-rod extending axially through a bore in said cylinder, means for reciprocating said piston along its axis including fluid pressure intake and drain ports extending through said cylinder, the former so disposed as continuously to apply said fluid pressure to the closed end of said piston, a sleeve valve fitting rotatably and coaxially within said piston and means for rotating the same about its axis, axially and angularly spaced coacting intake and drain ports provided in said valve sleeve and piston wall for alternately connecting the open end of said piston in fluid communication with said cylinder intake and drain ports, respectively, as said sleeve valve rotates, said piston ports exceeding in axial length the maximum stroke of said piston.

8. Apparatus according to claim 7 wherein the intake and drain ports of said piston and valve sleeve are relatively so shaped as progressively to vary with axial displacement of said piston, the angular sectors throughout which said piston and valve sleeve, intake and drain ports are respectively aligned, and in such manner as automatically to adjust said piston to a preselected mean position of piston displacement within said cylinder.

9. Apparatus according to claim 7 wherein said intake and drain ports of said piston and valve sleeve are of substantially trapezoidal configuration with their tapered sides extending longitudinally of said piston and relatively so inclined and proportioned, as automatically to correct for deviations in the mean displacement of said piston from a preselected norm thereof with respect to said cylinder.

10. An inertial force producing apparatus, comprising: a supporting structure, mounting a hydraulic cylinder enclosing a hollow cylindrically shaped piston open at one end and closed at the other, said cylinder having longitudinally spaced intake and drain ports, and said piston being fitted for longitudinal movement within said cylinder, an inertial force producing mass linked to said piston for displacement therewith, said piston having upper and lower pairs of oppositely disposed drain and intake ports of substantially trapezoidal configuration, the parallel sides of said ports extending transversely of said piston and being spaced apart by an amount greater than the maximum piston displacement, the intake and drain ports of said piston being positioned to remain in continuous communication, respectively, with the intake and drain ports of said cylinder throughout the maximum reciprocative displacement of said piston, the distance between the non-parallel sides of said piston ports being greater toward the ends of the piston adjacent thereto, respectively, and said drain ports of said piston being rotationally displaced by 90° from the intake ports thereof, and a tubular rotary sleeve valve closely fitting within said hollow piston and adapted to be rotated therein, means rotatably mounting said sleeve valve at a fixed longitudinal position with respect to said cylinder, said rotary sleeve valve also having upper and lower pairs of oppositely displaced ports disposed in rotative alignment with said upper and lower piston ports, respectively, the upper and lower valve ports of said sleeve valve being further in rotational alignment with each other.

11. A pile driving apparatus comprising a force producing means and means mounting the same for guided longitudinal movement between a pair of guide columns mounted in parallel alignment on either side of the upper portion of a pile element, said force producing means including a plurality of longitudinally displaced but rigidly connected platforms which extend transversely between said guide columns and adapted to be guided longitudinally by said columns, the lowermost of said platforms being connected to transmit downward forces to the top of said pile element, a hydraulic cylinder mounted centrally of an upper platform, said cylinder being provided with intake and drain ports connected, respectively, to a high pressure hydraulic source and to a hydraulic drain, said ports leading into said cylinder at longitudinally displaced positions, a hollow cylindrically shaped piston open at one end and closed at the other, said piston being fitted for longitudinal displacement within said cylinder, an inertial mass constrained to longitudinal movement between said upper and lower platforms and connected to be moved by said piston, said piston having upper and lower pairs of oppositely displaced valve ports of generally trapezoidal shape, the parallel sides of said ports running transversely of said piston and being displaced by an amount greater than the maximum piston stroke, said ports being positioned and adapted to remain in continuous communication, respectively, with the intake and drain ports of said cylinder, the distance between the non-parallel sides of said ports being greater towards the ends of the piston adjacent thereto, respectively, said upper valve ports being rotationally displaced by ninety degrees from said lower valve ports, and a tubular rotary sleeve valve closely fitting within said hollow piston and being rotatable therein, means for rotating the same at constant speed and at a fixed longitudinal position with respect to said cylinder, said rotary sleeve valve also having upper and lower pairs of oppositely disposed valve ports, disposed in rotational alignment with the valve ports in said piston, respectively, the upper and lower valve ports in said sleeve valve further being in rotational alignment with each other.

12. Inertial force producing apparatus, comprising: a rigid, force transmitting frame having a force applying member rigidly mounted thereon, and means for applying a substantially constant biasing force thereto; an inertial mass and means for displaceably mounting the same on said frame for movement toward and away from the direction of said biasing force; a force exerting, hydraulic device interposed between said mass and frame, said device being reversibly operable for applying force exertion between said frame and mass, in directions both toward and away from the direction of said biasing force; said device including switching means for periodically effecting such force reversal, thereby to reciprocate said mass, and by the resultant reaction thereof through said hydraulic device against said frame, to apply to said member, successive force impulses in directions alternately to supplement and to oppose said biasing force; said device also including means responsive to deviations in the mean position of reciprocative displacement of said mass from a relatively fixed position with respect to said frame, for adjusting the timing change-over actuations of said switching means, until said mean position is readjusted to said fixed position.

13. Inertial force producing apparatus, comprising: a rigid, force transmitting frame having a force applying member rigidly mounted thereon, and means for applying a substantially constant biasing force thereto; an inertial mass and means for displaceably mounting the same on said frame for movement toward and away from the direction of said biasing force; a force exerting, hydraulic device interposed between said mass and frame, said device being reversibly operable for applying force exertion between said frame and mass in directions both toward and away from the direction of said biasing force, and of greater magnitude in one said direction than in the other; said device including switching means for periodically effecting such force reversal, thereby to reciprocate said mass, and by the resultant reaction thereof through said hydraulic device against said frame, to apply to said member, successive force impulses of alternately greater and lesser magnitude in directions alternately to supplement and oppose said biasing force; said device also including means responsive to deviations in the mean position of reciprocative displacement of said mass from a relatively fixed position with respect to said frame, for adjusting the timing change-over actuations of said switching means, until said mean position is readjusted to said fixed position.

14. Inertial force producing apparatus, comprising: a rigid, force transmitting frame having a force applying member rigidly mounted thereon, and means for applying a substantially constant biasing force thereto; an inertial mass and means for displaceably mounting the same on said frame for movement toward and away from the direction of said biasing force; a force exerting, hydraulic device interposed between said mass and frame, said device including a hydraulic cylinder rigidly mounted on said frame and a differential piston reciprocable therein, connected to said mass; hydraulic pressure and valve switching means operative to reciprocate said piston and thereby said inertial mass, thus to exert by differential action of said piston, a force in one direction between said mass and frame of greater magnitude than the force exerted in the opposite direction, the force of greater magnitude being directed by reaction against said frame to supplement said biasing force, and the force of lesser magnitude being directed to lessen the same; and said device also including means responsive to deviations in the mean position of reciprocative displacement of said piston from a relatively fixed position with respect to said cylinder, for adjusting the timing change-over of said valve switching means until said mean position is readjusted to substantially said fixed position.

15. Inertial force producing apparatus, comprising: a rigid force transmitting frame having a force applying member rigidly mounted thereon, and means for applying a substantially constant biasing force thereto; an inertial mass and means for displaceably mounting the same on said frame for movement toward and away from the direction of said biasing force; a force exerting, hydraulic device interposed between said mass and frame, said device including a hydraulic cylinder rigidly mounted on said frame and a differential piston reciprocable therein, having a piston rod connected to said mass; hydraulic pressure and valve switching means operative to reciprocate said piston and thereby said inertial mass, thus to exert by differential action of said piston, a force in one direction between said mass and frame of greater magnitude than the force exerted in the opposite direction, the force of greater magnitude being directed by reaction against said frame to supplement said biasing force, and the force of lesser magnitude being directed to lessen the same; said piston having a transverse area such in relation to that of said piston rod that said force of greater magnitude is at least treble said biasing force, and said force of lesser magnitude is substantially less than said biasing force; said device also including means responsive to deviations in the mean position of reciprocative displacement of said piston from a relatively fixed position with respect to said cylinder, for adjusting the timing change-over of said valve switching means until said mean position is readjusted to substantially said fixed position.

16. Inertial force producing apparatus, comprising: a rigid, force transmitting frame having a force applying tool rigidly mounted thereon, and means for applying a substantially constant biasing force thereto; an inertial mass and means for displaceably mounting the same on said frame for movement toward and away from the direction of said biasing force; a force exerting, hydraulic device interposed between said mass and frame, said device including a hydraulic cylinder rigidly mounted on said frame and a differential piston reciprocable therein, connected to said mass; hydraulic pressure and valve switching means operative to reciprocate said piston and thereby said inertial mass, thus to exert by differential action of said piston, a force in one direction between said mass and frame of greater magnitude than the force exerted in the opposite direction, the force of greater magnitude being directed by reaction against said frame to supplement said biasing force, and the force of lesser magnitude being directed to lessen the same; said valve switching means including a first valve member attached to and longitudinally displaceable with said piston, and a second valve member rotatively and transversely displaceable with respect thereto and in fixed longitudinal relation with respect to said frame, said valve members having valve ports respectively disposed for periodic registration as said first member reciprocates and said second member rotates, and said valve ports being of longitudinally varying aperture such as automatically to maintain the mean position of reciprocative displacement of said piston in substantially fixed position relative to said cylinder.

17. Inertial force producing apparatus, comprising: a rigid, force transmitting frame having a force applying tool rigidly mounted thereon, and means for applying a substantially constant biasing force thereto; an inertial mass and means for displaceably mounting the same on said frame for movement toward and away from the direction of said biasing force; a force exerting, hydraulic device interposed between said mass and frame, said device including a hydraulic cylinder rigidly mounted on said frame and a differential piston reciprocable therein, connected to said mass; hydraulic pressure and valve switching means operative to reciprocate said piston and thereby said inertial mass, thus to exert by differential action of said piston, a force in one direction between said mass and frame of greater magnitude than the force exerted in the opposite direction, the force of greater magnitude being directed by reaction against said frame to supplement said biasing force, and the force of lesser magnitude being directed to lessen the same; said valve switching means including a first valve member attached to and longitudinally displaceable with said piston, and a second valve member rotatively and transversely displaceable with respect thereto and in fixed longitudinal relation with respect to said frame, each of said valve members having longitudinally and angularly spaced intake and drain valve ports respectively disposed for periodic and successive registration as to said intake and drain ports as said second member rotates, and said valve ports being of longitudinally tapered apertures, the tapers of which are disposed and proportioned for increasing the duration of registration as to said intake port and decreasing the duration of registration of said drain ports as said piston is shifted longitudinally in one direction, and vice versa for shifts of said piston in the opposite direction, for automatically maintaining the mean positions of reciprocative displacement of said piston in substantially fixed position relative to said cylinder.

18. Inertial force producing apparatus, comprising: a rigid force transmitting frame having a force applying tool rigidly mounted thereon, and means for applying a substantially constant biasing force thereto; an inertial mass and means for displaceably mounting the same on said frame for movement toward and away from the direction of said biasing force; a force exerting, hydraulic device interposed between said mass and frame, said device including a hydraulic cylinder rigidly mounted on said frame and a differential piston reciprocable therein and connected to said mass; a source of hydraulic pressure and valve switching means of said device, operative to reciprocate said piston by alternate application of pressure and drain to the opposite ends of said piston, and thence the application of said pressure to both piston ends, thus rapidly to accelerate the piston in one direction of displacement with the full force of said pressure over the entire piston area, and more slowly to accelerate the piston in the opposite direction of displacement by differential application of said pressure to said piston effective only over said piston rod area, thereby to exert a relatively large force for a relatively short duration in one direction between said mass and frame and a relatively small force for a much longer duration in the opposite direction therebetween, the force of greater magnitude being directed by reaction against said frame to supplement said biasing force, and the force of said lesser magnitude being directed to oppose the same.

19. Inertial force producing apparatus, comprising: a hydraulic cylinder, a piston reciprocable therein, an inertial mass reciprocated by said piston, valve means including a first valve member displaceable with said piston and having a cylindrical bore therein, a second valve member fitting rotatably within said bore and means rotatably mounting the same in fixed relation to said cylinder, intake and drain ports individual to said members, respectively, and relatively so disposed as to be brought into successive alignment as to said intake ports and thence as to said drain ports upon rotation of said second valve member, at least one each of said intake and drain ports being of a length in the direction of said piston displacement exceeding the maximum stroke of said piston, and said ports being of a configuration such as progressively to increase the angular sector of alignment of said intake ports and to decrease that of said drain ports as said first and second valve members are relatively displaced in one direction longitudinally of said piston, and the reverse thereof as said valve members are relatively displaced in the opposite direction longitudinally of said piston.

20. Inertial force producing apparatus, comprising: a hydraulic cylinder, a differential piston reciprocable therein, valve means including a first valve member displaceable with said piston and having a cylindrical bore therein, a second valve member fitting rotatably within said bore and means rotatably mounting the same in fixed relation to said cylinder, intake and drain ports individual to said members respectively, and relatively so disposed as to be brought into successive alignment as to said intake ports and thence as to said drain ports upon rotation of said second valve member, at least one each of said intake and drain ports being of a length in the direction of said piston displacement exceeding the maximum stroke of said piston, means for continuously impressing hydraulic fluid under pressure upon one end of said piston, means including said intake and drain ports of said valve means for alternately exposing the opposite end of said cylinder to the pressure of said hydraulic fluid and to drain upon rotation of said second valve member, thereby rapidly to accelerate said piston in one direction of displacement by application of the full force of said hydraulic pressure over the entire piston area, and to more slowly accelerate said piston in the opposite direction of displacement by differential application of said pressure to both ends of said piston.

21. Apparatus according to claim 11 wherein the intake and drain ports of said valves are of substantially trapezoidal configuration with their tapered sides extending longitudinally of said piston and relatively so inclined and proportioned, as automatically to correct for deviations in the mean displacement of said piston from a preselected norm thereof with respect to said cylinder.

References Cited by the Examiner

UNITED STATES PATENTS

| 1,665,046 | 4/28 | Tucker | 91—222 |
| 2,420,793 | 5/47 | O'Connor | 175—55 |
| 2,718,804 | 9/55 | Dannheim | 175—19 |
| 3,007,454 | 11/61 | Joelson | 91—321 |
| 3,072,103 | 1/63 | Hermann | 91—226 |

FOREIGN PATENTS

| 865,190 | 6/57 | Great Britain. |

FRED E. ENGELTHALER, *Primary Examiner.*